United States Patent [19]

Gaspar

[11] Patent Number: 4,667,996
[45] Date of Patent: May 26, 1987

[54] COFFEE FILTER SEPARATOR

[76] Inventor: Michael E. Gaspar, 115 W. Willow St., Newberry, Mich. 49868

[21] Appl. No.: 757,388

[22] Filed: Jul. 22, 1985

[51] Int. Cl.⁴ .............................................. B25J 1/00
[52] U.S. Cl. .................................................... 294/61
[58] Field of Search ...................... 294/61, 1.1, 25, 26; 99/295; 29/451; 271/18.1, 18.2

[56] References Cited

U.S. PATENT DOCUMENTS 805,664  11/1905  Ramage ................................ 294/25
4,285,114  8/1981  Underdahl ........................... 294/1.1

Primary Examiner—James B. Marbert
Attorney, Agent, or Firm—John F. Rohe; Franklin D. Wolffe

[57] ABSTRACT

A coffee filter separator having a handle to fit in one hand and tines to shear a single filter from a stack is claimed and disclosed herein. In one embodiment the handle is angled for convenient use. In another, the tines extend around the circumference of the ball to facilitate the use of the tool in any direction.

7 Claims, 6 Drawing Figures

U.S. Patent  May 26, 1987  4,667,996
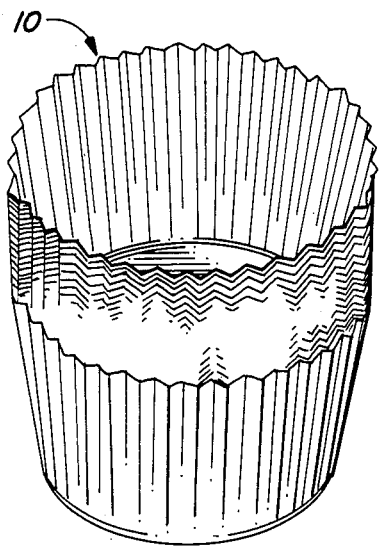
Fig. 1
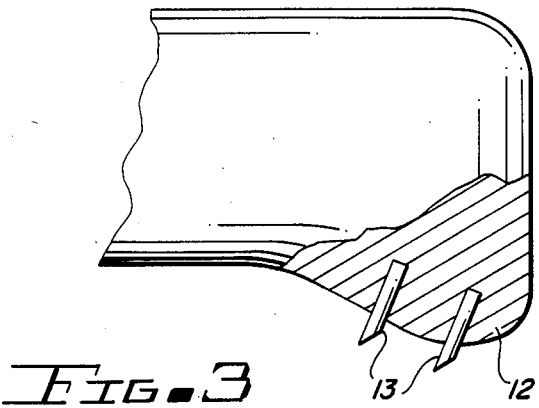
Fig. 3
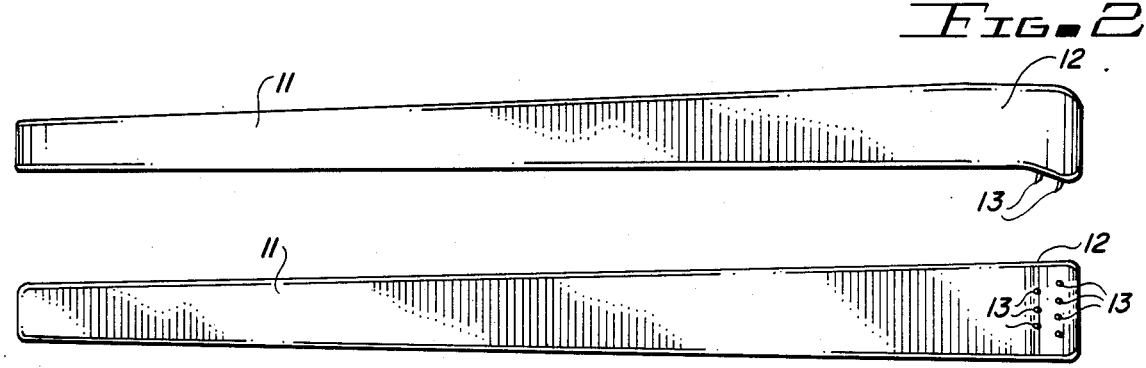
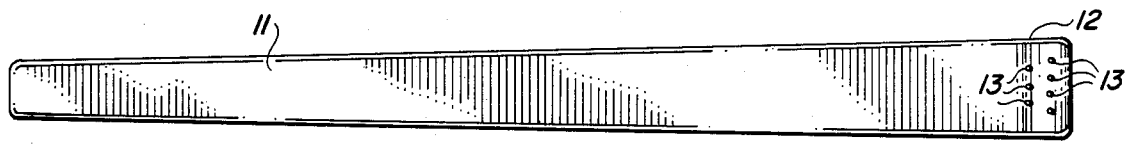
Fig. 2
Fig. 4
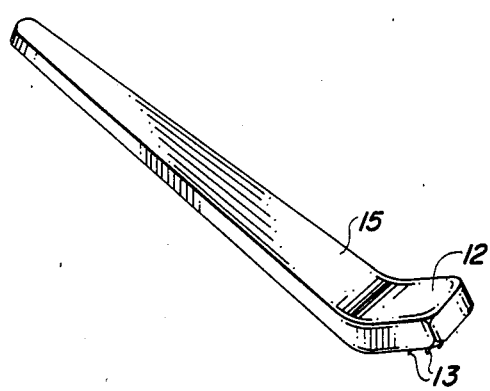
Fig. 5
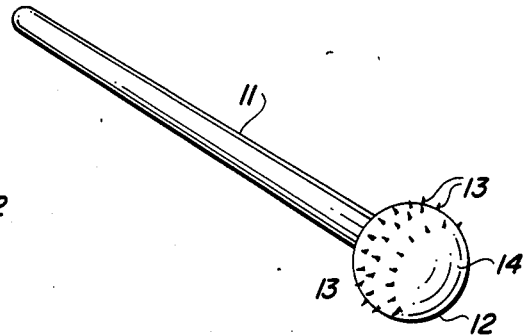
Fig. 6

COFFEE FILTER SEPARATOR

TECHNICAL FIELD

This invention relates to a tool for separating cupped or conical coffee filters.

BACKGROUND OF THE INVENTION

The popularity of cupped and conical shaped coffee filters accompanied the expanded use of drip type coffee makers. The coffee filters are typically packaged and sold in stacks of 100 or more. The stacked coffee filters have an inherent unwillingness to separate insofar as they are lightweight, air resistant and have a large mating surface area.

Only a single filter is to be used at a time. If, by accident, two or more filters are employed, the coffee flavor and richness will be adversely affectly. Furthermore, the cost effectiveness of the drip method of brewing coffee is compromised by accidently utilizing more coffee filters than required.

In high volume coffee production areas, such as restaurants, the speed with which the coffee filter is separated can be of importance to the effective operation of the business. Restaurants will often arrange a series of separated coffee filters prior to the arrival of morning traffic in order to facilitate the prompt access of a single filter. The series of separated filters consume valuable counter space.

In the home, the ability to separate coffee filters is a function and test of one's patience and digital dexterity. The elderly, or those suffering from an arthritic condition, can find the task of separating the coffee filters to be tedious.

It would appear advantageous to provide a small, convenient and inexpensive tool for separating a single filter from a stack. The tool should not damage the coffee filter when used and should be safe to use.

SUMMARY OF THE INVENTION

In accordance with the background of this invention, it is an object of the inventor to provide a small, convenient and inexpensive tool for separating a single coffee filter from a stack.

It is a further object of the inventor provide a tool that will not tear the relatively thin and fragile coffee filter.

The tool should be small, inexpensive, durable and capable of functioning every time.

It is a further object to provide a tool that is safe to use.

It has been learned by the inventor that a device having sharp and rigid tines at the end of a handle can be used to shear a single coffee filter from its stack. The tines pierce the filter, however do not cause it to be damaged. Since most commercially available filters are approximately 0.005 inch thick, optimum results can be achieved if the tines are also 0.005 inch in length. If the tines are longer than the filter thickness, there is a risk of separating more than one filter. If the tines are shorter, a risk of tearing the filter is present insofar as a firm, solid grip may not be attained.

Other objects, advantages and features of the invention will be apparent from the following detailed description of specific embodiments, when read in conjunction with the accompanying drawing.

BRIEF DESCRIPTION OF THE DRAWINGS

In the drawings,

FIG. 1 is a stack of typical, commercially available coffee filters.

FIG. 2 is an enlarged side view of a coffee filter separator.

FIG. 3 is an enlarged side view of a tine in FIG. 2.

FIG. 4 is an enlarged bottom view of a coffee filter separator.

FIG. 5 is an enlarged perspective view of a coffee filter separator, having an angled handle.

FIG. 6 is an enlarged perspective view of a coffee filter separator, utilizing the "ball type" end.

DETAILED DESCRIPTION OF THE DRAWINGS

Referring in detail to the drawings, and particularly to FIG. 1, there is illustrated a stack of commercially available coffee filters (10). Each filter is typically 0.005 inch in thickness. It is noted that the filters (10) are made of lightweight paper material, which is air resistant and there is a relatively large mating surface between the various filters. An inherent cohesive effect maintains the integrity of the stack of filters. Separating a filter from the filter stack (10) requires dexterity, and is a difficult task for the elderly or those with arthritis.

In order to facilitate the retrieval of a single coffee filter, the subject invention will cause a filter to be sheared from the remaining filters in the stack.

In further explanation of the invention, FIGS. 2 and 4 show a side and bottom view of a coffee filter separator. The handle end (11) is shown on the reader's left, while the working end (12) is shown toward the reader's right. The working end (12) includes a plurality of sharp and rigid tines (13). Preferably the tines will slope toward the bar surface proceeding from the handle end (11) to the working end (12) as shown in FIG. 3, which is an enlargement of a tine from FIG. 2. The inventor has learned that optimum results are achieved when the tines (13) extend 0.005 inch beyond the surface of the handle. The 0.005 inch does not present a threat to the user since the tines (13) are too short to cut a person's skin.

In order to facilitate the convenient use of the tool, an improved embodiment includes an angled handle (15), as shown in FIG. 5.

For high volume operations, such as a restaurant, it may be desirable to allow the tool to function in any orientation. Accordingly, FIG. 6 shows a ball (14) at the working end (12) of the coffee filter separator. A series of tines (13) extend around the circumference of the ball (15). Accordingly, the unit shown in Fig. 6 may be employed in any direction.

The inventor has also learned that optimum results are achieved if tines (13) are 0.010 to 0.015 inch in diameter.

The tines (13) should be placed near or adjacent to the tip of the working end (12). This placement assists in assuring that the tines (13) are the first item to contact the filter (10). It has been learned that the efficacy of the device is nullified if the tines (13) do not contact the filter (10) first.

Achieving the optimum number of tines (13) which come in contact with the coffee filter has been an objective of the inventor. If too few tines (13) are employed, there is a risk of tearing a coffee filter. On the other hand, too many tines (13) impose a manufacturing penalty and require the user to apply excessive pressure to obtain a solid filter grip. In general, it has been learned that the optimum number of tines (13) to come in contact with the coffee filter is seven. Accordingly, this would be taken into consideration when designing the "ball type" working end (12) of the coffee filter separator.

With this arrangement, as described above, it should be apparent that there has been provided a simple and efficient coffee filter separator.

While specific embodiments of the invention have been described in the foregoing specifications, it is to be understood that various modifications may be made from the specific details described, without departing from the spirit and scope of this invention.

I claim:

1. In a hand implement for separating a particular cup-shaped coffee filter from a nested stack of cup-shaped coffee filters, the improvement comprising:
   a plurality of rigid, sharp tines protruding from a surface of a work engaging end of a handle, said tines being generally parallel to each other and disposed at an angle relative to said handle surface and being of a length sufficient to penetrate substantially a full thickness of said particular filter without engaging a next adjacent filter of said stack in order to avoid tearing said particular filter while gripping and separating only said particular filter from said stack.

2. The improvement as in claim 1, and further comprising:
   said tines length being substantially equal to said filter thickness.

3. The improvement of claim 1 wherein the tines extend 0.005 inches from the surface of the working end of the bar.

4. The improvement of claim 1 wherein the tines are 0.010 to 0.015 inch in diameter.

5. The improvement of claim 1 wherein a beveled angle of a tine slopes toward the bar surface proceeding from the handle end toward the working end of the bar.

6. The improvement of claim 1 which comprises seven tines.

7. A method of separating coffee filters with a device having a plurality of rigid, beveled and sharp tines which, when placed adjacent to and pulled away from the filter at the end of the stack of filters, shears a single filter from other filters in the stack.

* * * * *